United States Patent
Rauer et al.

(10) Patent No.: US 12,399,217 B1
(45) Date of Patent: Aug. 26, 2025

(54) ELECTRONIC DEVICE TESTING SYSTEM AND METHOD OF USE

(71) Applicant: Blue Clover Design, LLC, San Francisco, CA (US)

(72) Inventors: Robert Eric Rauer, San Francisco, CA (US); Peter Ethan Staples, San Francisco, CA (US)

(73) Assignee: Blue Clover Design, LLC, San Francisco, CA (US)

( * ) Notice: Subject to any disclaimer, the term of this patent is extended or adjusted under 35 U.S.C. 154(b) by 425 days.

(21) Appl. No.: 17/717,810

(22) Filed: Apr. 11, 2022

Related U.S. Application Data

(60) Provisional application No. 63/173,040, filed on Apr. 9, 2021.

(51) Int. Cl.
| | |
|---|---|
| G06F 21/00 | (2013.01) |
| G01R 31/30 | (2006.01) |
| G01R 31/302 | (2006.01) |
| G01R 31/317 | (2006.01) |
| G01R 31/3181 | (2006.01) |
| G01R 31/319 | (2006.01) |
| H04L 9/32 | (2006.01) |

(52) U.S. Cl.
CPC ... *G01R 31/31713* (2013.01); *G01R 31/3004* (2013.01); *G01R 31/3025* (2013.01); *G01R 31/31813* (2013.01); *G01R 31/31912* (2013.01); *G06F 21/00* (2013.01); *H04L 9/3213* (2013.01)

(58) Field of Classification Search
CPC .......... G01R 31/31713; G01R 31/3004; G01R 31/3025; G01R 31/31813; G01R 31/31912; G01R 31/30; G01R 21/302; G06F 21/00; H04L 9/3213; H04L 9/32
See application file for complete search history.

(56) References Cited

U.S. PATENT DOCUMENTS

| | | | |
|---|---|---|---|
| 2007/0022323 A1* | 1/2007 | Loh ................ | G01R 31/318314 714/38.14 |
| 2007/0253553 A1* | 11/2007 | Abdul Rahman . | G06Q 20/4014 380/259 |
| 2016/0373816 A1* | 12/2016 | Kashikar ............ | H04N 21/4113 |
| 2018/0328982 A1* | 11/2018 | Rezgui .................... | G10L 19/02 |
| 2021/0203568 A1* | 7/2021 | Yu ........................... | H04L 63/20 |
| 2022/0247748 A1* | 8/2022 | Kim .................... | H04L 63/0209 |

* cited by examiner

*Primary Examiner* — Jayesh M Jhaveri
(74) *Attorney, Agent, or Firm* — Jeffrey Schox

(57) ABSTRACT

An electronic device testing system, including: a standardized control system, an in-circuit tester configured to mate with the standardized control system and a device, a remote cloud system, a user interface, and/or any other suitable components. The user interface can optionally be configured to send a test plan to the remote processing system and/or to receive a test report associated with the device from the remote processing system.

21 Claims, 14 Drawing Sheets

```
title: "test plan with calibration"
identPrefix: "ICT-T"
calibration:
# Default offsets
- impedance: -100 # 100 Ohm
  voltage: +20mV # Default for all voltage channels
  voltageDATP01: +40mV
  voltageMUX2: +20mV
  voltageMUX3: +30mV
  currentVARV: -20mA
# Additional offsets specific to a particular PPC
- ppc: 39c8db  # Additional offsets for this PPC
  impedance: +120hm
  voltageDATP08: -10mV
  current5V: +100mA
suite:
- title: Impedance Measurement
  steps:
    - command: mux 0 RATP02
    - command: mux 1 RATP17
    - command: mux 2 RA
    - command: mux 3 RVREF
    - command: short 0 2 set
    - command: short 1 3 set
    - command: measure impedance 10-20Ohm
```

```
- command: program CMSIS blinky.hex
  pack: Keil.LPC1100_DFP.1.4.0.pack
  target: LPC11C24FBD48/301
```

Project: ICT Demo

| PLT S/N | 00040 |
|---|---|
| Test Plan | ICT Demo Test Plan V1.6 |
| Time | 2022-02-21T23:22:42Z |
| PLT SN | 00040 |
| PPC ID | bc9154 |
| MCU ID | 047323d08da28de1 |
| BLE MAC | cd:21:b4:5a:9b:c3 |
| PLT MODEL | plt-300a |

Test Result: PASS

Test Duration: 8.388s

Test Item Results

| Time | Item | Description | Pass? |
|---|---|---|---|
| 0.334s | ICT-001 | Power up | ✓ |
| 0.928s | ICT-002 | Identify DUT | ✓ |
| 1.365s | ICT-003 | Erase nRF52 | ✓ |
| 4.814s | ICT-004 | Program PLT DEMO BOARD nRF52 FW | ✓ |
| 7.124s | ICT-005 | Impedance Measurement | ✓ |
| 7.587s | ICT-006 | Measure BAT_SENSE TP5 | ✓ |
| 8.051s | ICT-007 | Voltage Measurement on Trim Pot | ✓ |
| 8.353s | ICT-008 | Power down | ✓ |
| 8.388s | Result | ICT Demo Test Plan V1.6 | ✓ |

FIGURE 6A

Test Step Results

| Time | Step | Description | Min | Max | Result | Pass? |
|---|---|---|---|---|---|---|
| 0.007s | ICT-001 | Power up | | | | |
| 0.179s | ICT-001.0 | power SWD on | | | PASS | |
| 0.334s | ICT-001 | Power up | | | PASS | |
| 0.334s | ICT-002 | Identify DUT | | | | |
| 0.771s | ICT-002.0 | identify nRF52 | | | nRF52 | |
| 0.928s | ICT-002 | Identify DUT | | | PASS | |
| 0.928s | ICT-003 | Erase nRF52 | | | | |
| 1.226s | ICT-003.0 | erase nRF52 | | | nRF52 | |
| 1.365s | ICT-003 | Erase nRF52 | | | PASS | |
| 1.365s | ICT-004 | Program PLT DEMO BOARD nRF52 FW | | | | |
| 3.874s | ICT-004.0 | program nRF52 none,ly18-zephyr-fw-0.1.2.hex,none | | | nRF52 | |
| 4.014s | ICT-004 | Program PLT DEMO BOARD nRF52 FW | | | PASS | |
| 4.014s | ICT-005 | Impedance Measurement | | | | |
| 4.174s | ICT-005.0 | mux 0 RATP02 | | | - | |
| 4.349s | ICT-005.1 | mux 1 RATP03 | | | - | |
| 4.489s | ICT-005.2 | mux 2 8A | | | - | |
| 4.638s | ICT-005.3 | mux 3 SVREF | | | - | |
| 4.780s | ICT-005.4 | short 0 2 set | | | PASS | |
| 4.937s | ICT-005.5 | short 1 3 set | | | PASS | |
| 6.672s | ICT-005.6 | measure impedance >-10hm | | | 11.200Ω | |
| 6.827s | ICT-005.7 | short 0 2 release | | | PASS | |
| 6.983s | ICT-005.8 | short 1 3 release | | | PASS | |
| 7.124s | ICT-005 | Impedance Measurement | | | PASS | |
| 7.125s | ICT-006 | Measure BAT_SENSE TPS | | | | |
| 7.272s | ICT-006.0 | mux 0 RATP05 | | | - | |
| 7.436s | ICT-006.1 | measure voltageMUX0 -20-20V | -20V | 20V | 1.477V | |
| 7.587s | ICT-006 | Measure BAT_SENSE TPS | | | PASS | |
| 7.587s | ICT-007 | Voltage Measurement on Trim Pot | | | | |
| 7.744s | ICT-007.0 | mux 0 RATP03 | | | - | |
| 7.899s | ICT-007.1 | measure voltageMUX0 2-3.5V | 2V | 3.500V | 2.134V | |
| 8.051s | ICT-007 | Voltage Measurement on Trim Pot | | | PASS | |
| 8.051s | ICT-008 | Power down | | | | |
| 8.207s | ICT-008.0 | power SWD off | | | PASS | |
| 8.353s | ICT-008 | Power down | | | PASS | |
| 8.388s | Result | ICT Demo Test Plan V1.8 | | | - | |

ELECTRONIC DEVICE TESTING SYSTEM AND METHOD OF USE

CROSS-REFERENCE TO RELATED APPLICATIONS

This application claims the benefit of U.S. Provisional Application No. 63/173,040 filed Apr. 9, 2021, which is incorporated in its entirety by this reference.

TECHNICAL FIELD

This invention relates generally to the electronics field, and more specifically to a new and useful electronic device testing system in the electronics field.

BRIEF DESCRIPTION OF THE FIGURES

FIGS. 5A and 5B depict illustrative examples of test plans.

FIG. 6A depicts a first illustrative example of a test report, including a test score for each test item.

FIG. 6B depicts a second illustrative example of a test report, including a test score for each test step.

FIGS. 11A, 11B, and 11C depict illustrative examples of the remote user interface.

DETAILED DESCRIPTION

The following description of the embodiments of the invention is not intended to limit the invention to these embodiments, but rather to enable any person skilled in the art to make and use this invention.

1. Overview

Figure 1:
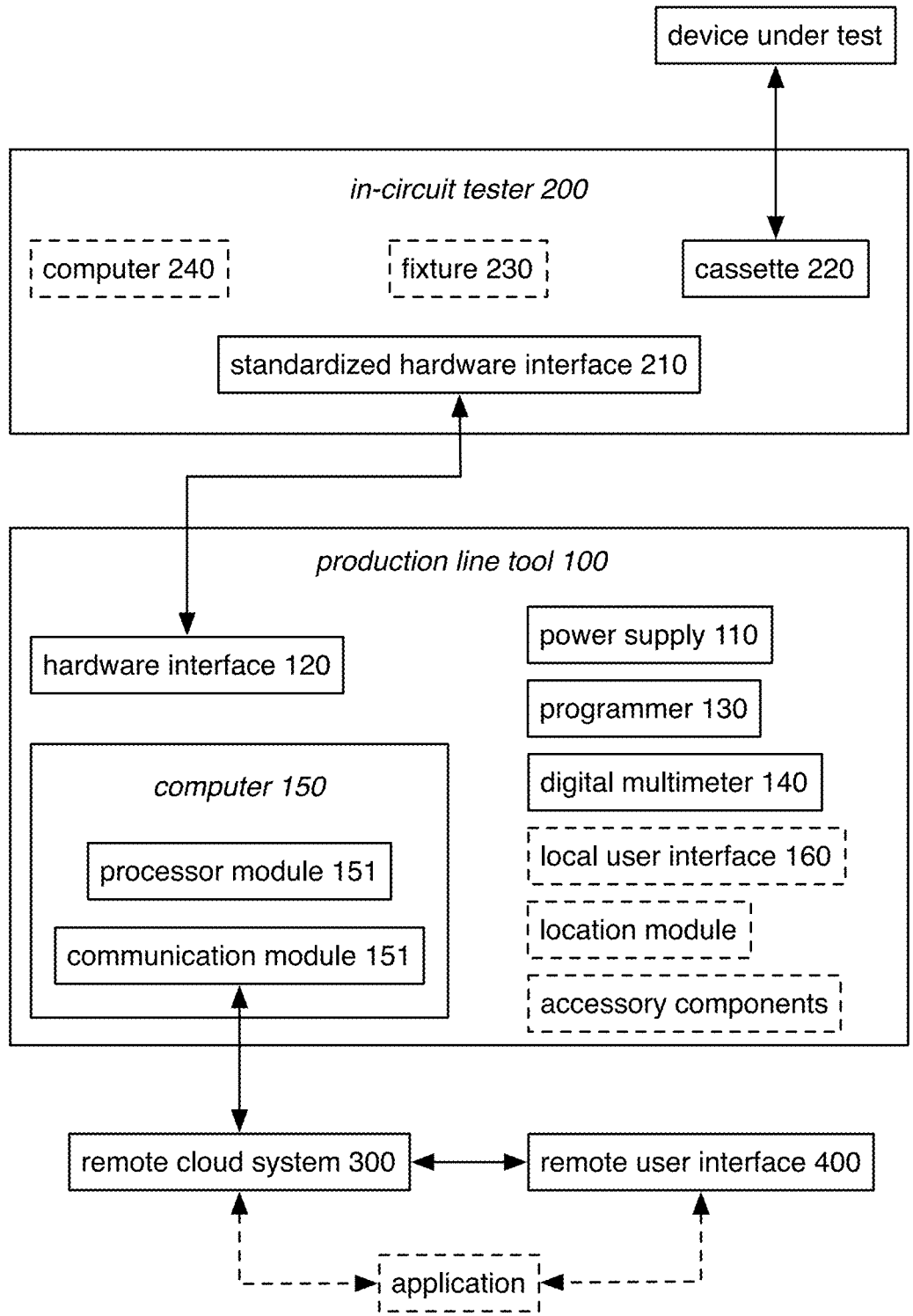
FIG. 1 is a schematic representation of a variant of the system.

As shown in FIG. 1, the electronic device testing system can include: a production line tool (PLT) 100, an in-circuit tester (ICT) 200, a remote cloud system 300, a remote user interface 400, and/or any other suitable components. In variants, the system can function to automatically test electronic devices, to remotely design and deploy a testing plan for the PLT 100 to implement and/or to remotely acquire test reports.

2. Examples

In an example, a set of identical production line tools (PLT) can be associated with an organization, wherein each PLT is situated in a production line to perform tests on a device (e.g., a series of test steps within a test plan). A PLT can include a power supply, an integrated circuit programmer, a digital multimeter (and/or set of other measurement instruments), a computer, a PLT hardware interface, and/or any other suitable components. The PLT is removably mated to a custom in-circuit tester (ICT) that includes: a standardized hardware interface configured to mate with the PLT hardware interface and a custom cassette configured to mate with the device, enabling the PLT to perform electronic tests on the device and/or upload software to the device. To utilize a PLT (e.g., the same PLT or a different, identical PLT) to perform tests on a new device, a new custom cassette can be manufactured to mate with the new device (e.g., used with a new or old ICT). Each PLT can be continuously and securely connected to a remote cloud system, wherein test reports generated by PLTs are uploaded to the remote cloud system in real-time (e.g., wherein the test reports can be encrypted by a symmetric or asymmetric key and/or unencrypted). The remote cloud system is additionally connected to a remote user interface which is accessible by authenticated users. The remote user interface can be used to design and deploy test plans, wherein a test plan includes an ordered set of commands selected from a library of commands (e.g., wherein the library of commands is associated with the device). Commands can optionally be modified for a given device and/or ICT. Test reports (e.g., including a binary success score for each test step in a test plan) can be viewed at the remote user interface, wherein notifications are sent to one or more users in response to a failure of a test step.

3. Technical Advantages

Variants of the technology can confer one or more advantages over conventional technologies.

Conventional methods of electronic device testing require an expensive, entirely custom-built testing tool with manually developed software for each test across multiple stages of electronic assembly manufacturing. This conventional method is often performed with two separate companies (one for the software development and one for the hardware development), which lacks the technological and economic advantages of implementing the software and hardware development in tandem. Furthermore, the iteration and deployment of the software and hardware are conventionally performed on-site, which can increase costs and time.

First, variants of the technology can drastically reduce the time to develop and implement software to test a device under test (DUT). In a first example, software can be remotely designed and uploaded to a production line tool (PLT), which can enable quick iterations of the software commands and rapid deployment of a test. In a second example, the software command design process can be significantly simplified for a user by providing the user with a library of pre-designed commands (e.g., commands relevant to the DUT). In this example, by using a standardized PLT that can receive and implement the software (e.g., implement in conjunction with a custom in-circuit tester) rather than a fully custom device, the commands in the library can be pre-designed to properly interface with the PLT. In particular, users can modify specific sections of a command (e.g., a target resistance threshold for a test, pin locations used on the standardized hardware interface 210 and/or cassette 220 of the ICT, test locations on the DUT, etc.) without needing to design the software from scratch.

Second, variants of the technology can drastically reduce the time to develop and implement hardware to test a DUT.

In variants, the system implements a PLT that includes the bulk of the hardware required to implement a given DUT test, wherein the PLT is standardized across different DUTs. Additionally, in variants, the system implements an in-circuit tester (ICT), wherein a portion of the ICT is standardized (e.g., to mate with the PLT) and wherein a custom cassette of the ICT can be custom manufactured to mate with a specific DUT and/or to perform a specific test. Thus, a significant section of the hardware development time is eliminated through the use of standardized components. In an example, in the event of a DUT modification, only the cassette and/or an ICT fixture requires modifications. This can enable the same PLT, and, in variants, the same ICT, to test different DUTs (e.g., from different manufacturers, with different I/O or trace layouts, etc.).

Third, variants of the technology can provide a remote interface for users to view test reports and/or receive notifications based on the test reports. For example, remote users can automatically receive a notification when a test has failed. Furthermore, variants of the technology can implement a tiered authentication system such that different users can have differing authentication credentials that enable test report viewing and/or test plan editing for each PLT and/or set of PLTs.

However, further advantages can be provided by the system and method disclosed herein.

4. System

Figure 2:
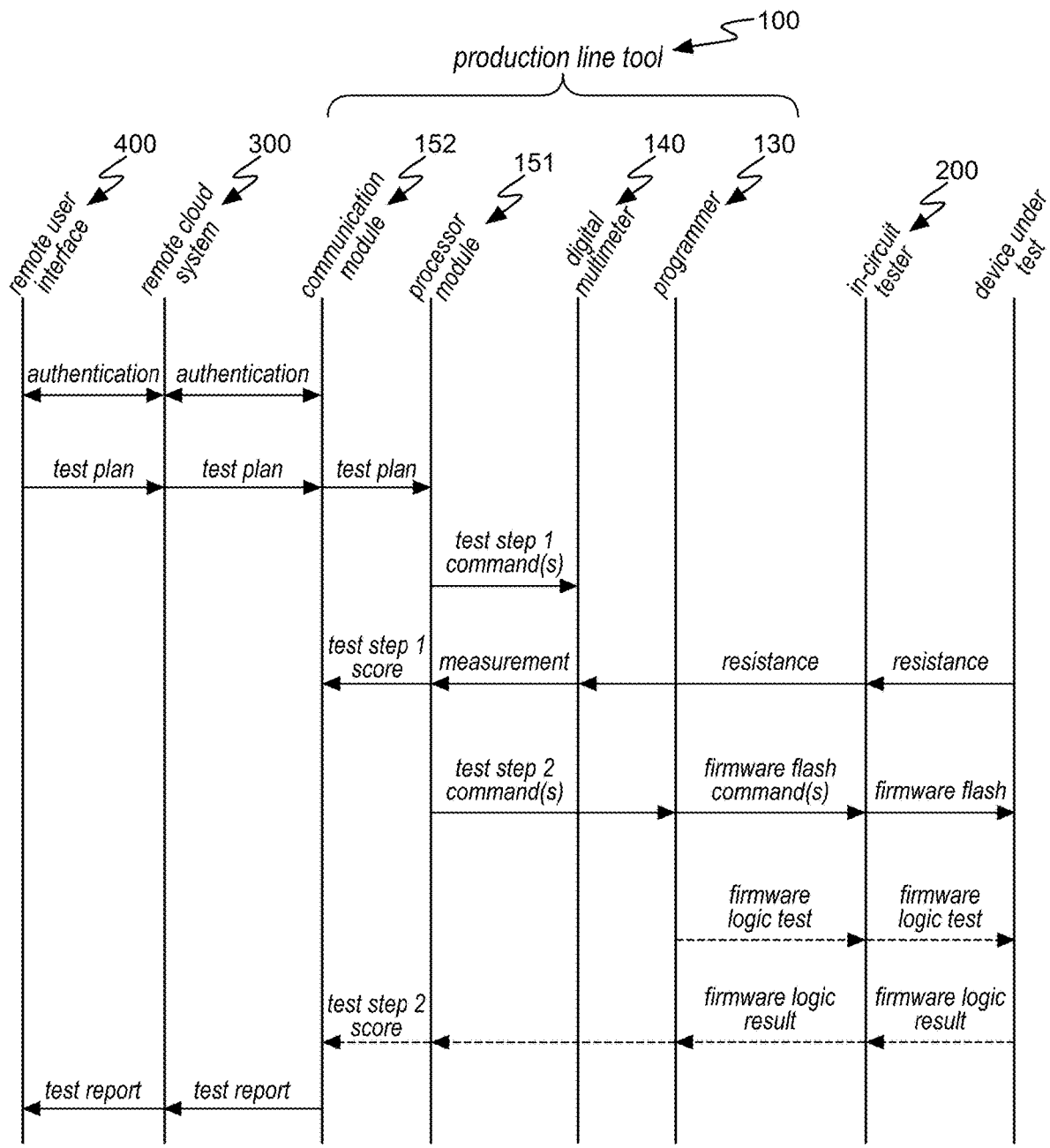
FIG. 2 is a schematic representation of an illustrative example of data transfer between components of the system.

As shown in FIG. 1, the electronic device testing system can include: a production line tool (PLT) 100, an in-circuit tester (ICT) 200, a remote cloud system 300, a remote user interface 400, and/or any other suitable components. Communication between system components can be performed in real time (e.g., responsive to a request, responsive to a test report generation, responsive to a test failure, etc.), iteratively, asynchronously, periodically, and/or at any other suitable time. An illustrative example of data transfer between system components is shown in FIG. 2.

Figure 3:
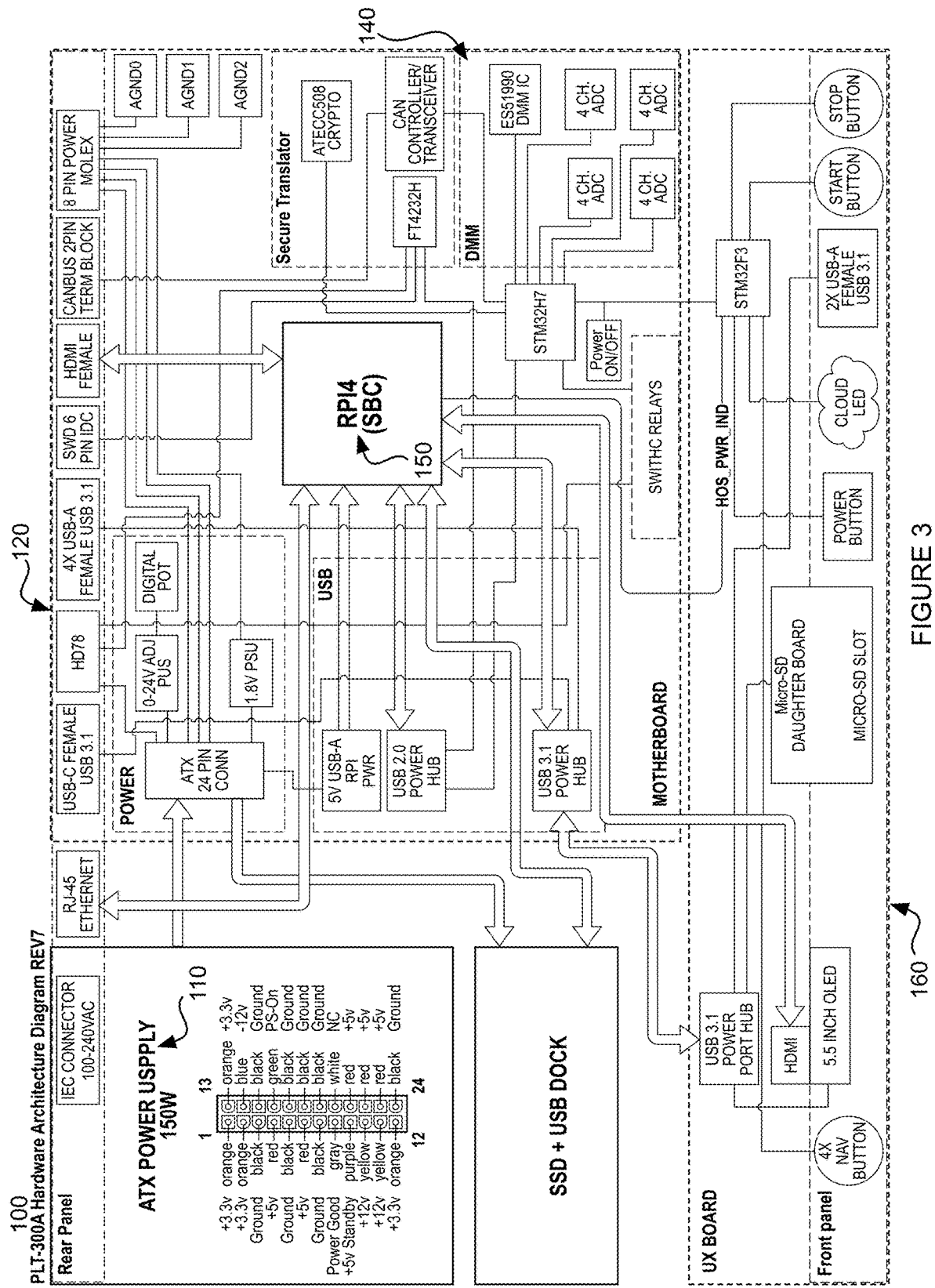
FIG. 3 is a schematic representation of an example of a production line tool.

The PLT 100 functions to perform one or more electronic tests on a device under test (DUT) in a manufacturing production line. Additionally or alternatively, The PLT 100 can function to program a device (e.g., firmware programming, device provisioning, etc.). The PLT 100 (e.g., a standardized control system) can include: a power supply 11o, a PLT hardware interface 120, a programmer 130, a digital multimeter 140; a computer 150, and/or any other suitable components. An example of this is shown in FIG. 3. Examples of a DUT can include: a chip, circuit board (e.g., PCB), electronic product (e.g., mobile device, computer, etc.), any electronics assembly, and/or any other target.

The PLT 100 can be one of a set of PLTs (e.g., a set of identical or different PLTs, each with a unique identifier) associated with an organization, platform (e.g., remote computing system), and/or other entity. The set of PLTs can be divided into subsets based on deployment groups, projects, and/or any other group. In a first embodiment, a subset of PLTs are configured to run the same test plan (e.g., on instances of the same device, on multiple devices, etc.). For example, a first deployment group of the set of PLTs can be used for in-circuit testing (e.g., during manufacturing, prototyping, etc.) and a second deployment group of the set of PLTs can be used for Final Assembly, Test and Pack-out (FATP) testing. In a second embodiment, a subset of PLTs are configured to run tests (e.g., from one or more test plans) on instances of the same device. For example, a first deployment group of the set of PLTs can be used for testing a first DUT and a second deployment group of the set of PLTs can be used for testing a second DUT. In a specific example, the first DUT and second DUT can be two stages of the same product during manufacturing.

The power supply 11o functions to supply power to the PLT 100, to the DUT via the PLT 100, and/or to any other system component. The power supply 11o can be connected to the computer 150 and/or any other PLT 100 component. The power supply 11o can include a wired connection (e.g., AC power), wireless connection (e.g., inductive charger, RFID charging, etc.), a battery (e.g., secondary or rechargeable battery, primary battery, etc.), and/or any other suitable system. In variants, the power supply 11o can be programmable (e.g., manually programmable, controlled via the computer 150, etc.).

Figure 7A:
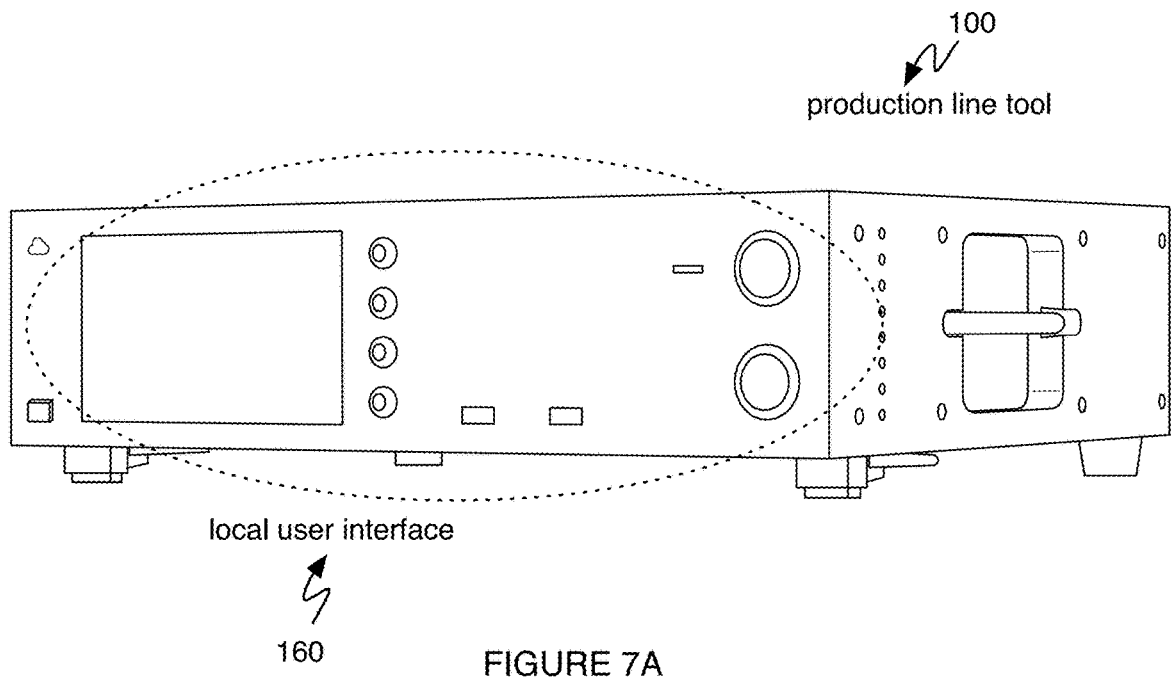
FIGS. 7A and 7B depict examples of a production line tool.
Figure 7B:
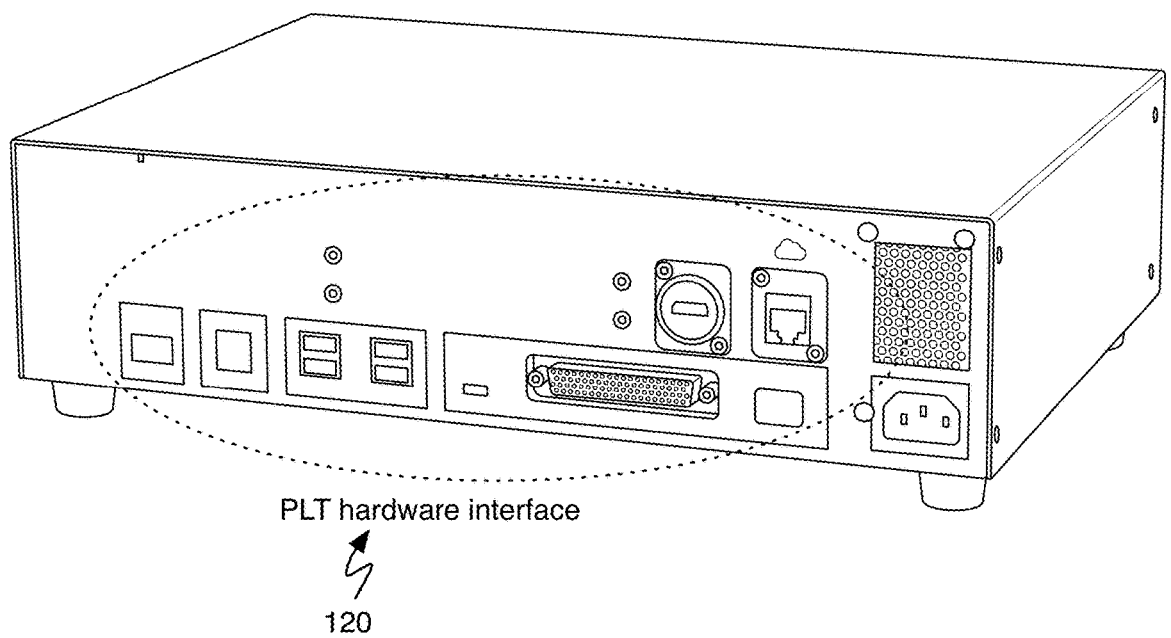

The PLT hardware interface 120 functions to connect the PLT 100 to a DUT. The PLT hardware interface 120 preferably connects the DUT to the programmer 130, the digital multimeter 140, and/or the computer 15o, but can alternatively connect the DUT to any other system component. In a first variant, the PLT hardware interface 120 connects the PLT 100 to the standardized hardware interface 210 of the ICT 200, wherein the cassette 220 of the ICT 200 is connected to the DUT. In a second variant, the PLT hardware interface 120 directly connects the PLT 100 to the DUT. The PLT hardware interface 120 can include removable cable connections (e.g., a 762 mm HD78 male-to-male cable), permanent wired connections, and/or any other connector. An example is shown in FIG. 7B. In a third variant, the PLT hardware interface 120 can connect to auxiliary sensors and/or instruments, which, in turn, can connect to the DUT. However, the PLT hardware interface 120 can be otherwise configured.

The programmer 130 functions to communicate with the DUT and/or test the DUT (e.g., via the ICT 200). The programmer 130 (e.g., an integrated circuit programmer) can be connected to the computer 150, the PLT hardware interface 120, the ICT 200, any PLT 100 component, and/or any other system component. In a first example, the programmer 130 flashes firmware onto one or more processors associated with the DUT (e.g., as part of a test step in a test plan, prior to a test step, for device provisioning, etc.). In a second example, the programmer 130 monitors and/or controls pins on the DUT (e.g., to test for shorts and/or opens in the DUT, detect defects in the DUT, etc.). In this example, the programmer 130 can monitor the pins via the digital multimeter 140. In a third example, the programmer 130 can test internal logic of the DUT (e.g., to debug firmware and/or a circuit). However, the programmer 130 can be otherwise configured.

The digital multimeter 140 functions to take electrical measurements of the DUT (e.g., via the ICT 200). The digital multimeter 140 can be connected to the computer 150, the programmer 130, the PLT hardware interface 120, the ICT 200, any PLT 100 component, and/or any other system component. Electrical measurements can include voltage, current, resistance, impedance, and/or any other electrical quantity. However, the digital multimeter 140 can be otherwise configured. However, the PLT 100 can include any other suitable set of measurement instruments.

The computer 150 functions to control PLT 100 components, execute test plans, and/or communicate with the remote cloud system 300. The computer 150 can be connected to the power supply 11o, the programmer 130, the digital multimeter 140, the remote cloud system 300, and/or any other system component. The computer 150 can include a processor module 151, a communication module 152, and/or any other suitable computing components.

The processor module 151 functions to execute test plans (e.g., received via the communication module 152), generate test reports, control the local user interface 16o, and/or provide other local functionalities local to the PLT 100. The processor module 151 can include one or more: CPUs, GPUs, custom FPGA/ASICS, microprocessors, and/or any other suitable components.

A test plan can include an ordered set of test commands to control any component of the PLT 100 (e.g., wherein the PLT 100 can control the ICT 200 and/or DUT). Optionally, the test plan can be organized into test items wherein each item comprises one or more test steps (e.g., wherein each test step is a single command, wherein each test step is multiple commands, etc.). The commands can be written in YAML script and/or any other language. Examples of test steps can include: electrical measurements (e.g., voltage, current, resistance and/or impedance, capacitance, frequency, etc.), logic measurements, UART tests, CAN Bus tests, DUT programming (e.g., erase, software upload, reset, restart, etc.; an example is shown in FIG. 5B), DUT identification, and/or any other electrical device task. In variants, a test plan can evaluate whether a DUT assembly was fabricated correctly (e.g., by checking for resistance, capacitance, shorts, opens, etc.). A test plan can be executed automatically, periodically, in response to a request (e.g., a user request local at the PLT 100, a remote user request via the remote user interface 400, etc.), and/or can be otherwise executed.

A test report can be generated during and/or after a test plan is executed. The test report can include a test score for the entire test plan, for a subset of the test plan (e.g., a subset of test items, test steps, and/or commands), and/or for each test step in the test plan. The test score can be continuous, discrete, binary, categorical, and/or otherwise defined. In a first example, the test score is an electrical measurement value of the DUT (e.g., obtained via an electrical measurement of the ICT 200). In a second example, the test score is a logic result acquired from a logic test. In a third example, the test score is a binary success or fail score based on whether a measurement is above or below a threshold value. Optionally, for any binary test score, if a single test step fails, the test item and/or the entire test plan fails. Examples are shown in FIG. 6A and FIG. 6B.

In a first variant, a generated test report can be uploaded to the remote cloud system 300 (e.g., via the communication module 152). The test report can be uploaded: in real-time (e.g., after the test plan is complete, after each test step is complete, etc.), periodically in batches, in response to a request, in response to a test score indicating a test failure, and/or at any other time. In a second variant, the test report can be locally stored at the PLT 100 (e.g., on a solid-state device). In a first example, the test report is stored locally and, additionally, uploaded to the remote cloud system 300. In a second example, the test report can be stored locally without uploading to the remote cloud system 300. In a third example, the test report can be stored locally when the communication module 152 is not connected to the remote cloud system 300.

However, the processor module 151 can be otherwise configured.

The communication module 152 functions to facilitate communication with the remote cloud system 300. The communication module 152 can send test reports (e.g., including notifications of test step failures) and/or any other information. The communication module 152 can receive software (e.g., firmware, test plans, etc.) and/or any other information.

The communication module 152 can facilitate wired and/or wireless communication. The communication module 152 can use: 802.11x, Wi-Fi, Wi-Max, WLAN, NFC, RFID, Bluetooth, Bluetooth Low Energy, BLE long range, ZigBee, cellular telecommunications (e.g., 2G, 3G, 4G, LTE, etc.), radio (RF), microwave, IR, audio, optical, wired connection (e.g., USB), and/or any other suitable communication system. Preferably, the connection between the communication module 152 and the remote cloud system 300 is continuous, but can alternatively be noncontinuous.

Communications can be encrypted (e.g., using cryptographic datum, such as a shared symmetric key or asymmetric key pairs, etc.), unencrypted (e.g., cleartext), signed (e.g., with a key), or unsigned. Authentication (e.g., a secure two-way authentication) can occur between the communication module 152 and the remote cloud system 300 prior to connection, prior to sending and/or receiving information, and/or at any other time. Authentication can include locally storing a cloud identifier associated with the remote cloud system 300 (e.g., storing the identifier at the communication module 152, the processor module 151, and/or any other PLT 100 component), wherein the communication module 152 authenticates the remote cloud system 300 by using the stored cloud identifier (e.g., by comparing the cloud identifier to an identifier received from the remote cloud system 300). Additionally or alternatively, the remote cloud system 300 can store a PLT identifier associated with the PLT 100, wherein the remote cloud system 300 authenticates the communication module 152 by using the stored PLT identifier (e.g., by comparing the PLT identifier to an identifier sent by the communication module 152). Each PLT 100 can be associated with one or more unique PLT identifiers. Additionally or alternatively, the remote cloud system 300 and the PLT 100 can store complimentary keys (e.g., cryptographic datum) (e.g., the PLT 100 stores the private key and the remote cloud system 300 stores the public key; both store a symmetric key; etc.), wherein the receiving system can verify the authenticity and/or decrypt the received communication using the locally-stored key. In a specific example, the authentication includes TLS mutual authentication and/or any other mutual authentication technology. In variants, the communication module 152 is configured to only allow remote cloud connection with the remote cloud system 300.

However, the communication module 152 can be otherwise configured.

However, the computer 150 can be otherwise configured.

Optionally, the PLT 100 can include a local user interface 160 which can function to facilitate interaction with a user local to the PLT 100. The local user interface 160 can be connected to the computer 150 and/or any other PLT 100 component. The local user interface 160 can include one or more outputs, including: displays (e.g., LED display, OLED display, LCD, etc.), audio speakers, lights (e.g., LEDs), tactile outputs (e.g., vibratory motors, etc.), printers, and/or any other suitable output. In a first example, the local user interface outputs can display a test status (e.g., a test report, an identifier of the currently deployed test plan, an identifier of a currently executing test step in the test plan, a time since last test step, a time until the next test step, etc.). In a second example, the local user interface outputs can display a remote cloud system connection status (e.g., a binary status if the connection is present, a strength of the connection, etc.). In a third example, the local user interface outputs can provide notifications to a user (e.g., via visual or auditory output). Notifications can occur in response to failure of a test step and/or test plan, a test score below or above a threshold, a break in connection to the remote cloud system 300, and/or at any other time. The local user interface 160 can additionally or alternatively include one or more inputs, including: buttons, touchscreens (e.g., capacitive, resistive, etc.), a mouse, a keyboard, and/or any other suitable input. In an example, the local user interface inputs can enable a user to execute a test plan (e.g., starting and/or stopping a test plan, starting and/or stopping one or more test steps in a test plan, etc.). Preferably, the inputs do not enable a user to design a test plan at the PLT 100, but can alternatively enable a user to design a test plan at the PLT 100. An example is shown in FIG. 7A. However, the local user interface 160 can be otherwise configured.

Optionally, the PLT 100 can include a location module which can function to determine the location of the PLT 100 (e.g., a geographic location, a specific location within a manufacturing plant, etc.). The location module can be connected to the computer 150 and/or any other PLT 100 component. The location module can include a GPS unit, a Bluetooth positioning unit, a RFID unit, a GNSS unit, a triangulation unit, a Wi-Fi connection location unit, a WHOIS unit (e.g., performed on IP address or MAC address), a GSM/CDMA cell identifier, a self-reporting location information unit, and/or any other suitable location systems. However, the location module can be otherwise configured.

Optionally, the PLT 100 can include one or more accessory components. Any accessory component can be connected to any PLT 100 component. Accessory components can function to test a DUT, program a DUT, identify a DUT, and/or to otherwise interact with one or more DUTs. Examples of accessory components include: a barcode scanner, an NFC tag reader and/or writer, a motion sensor, a camera, a temperature sensor, and/or any other suitable components.

However, the PLT 100 can be otherwise configured.

The in-circuit tester (ICT) 200 functions to interact directly with the DUT, including executing one or more test steps in the test plan. The ICT 200 is connected to the DUT (e.g., via the cassette 220) and the PLT 100 (e.g., via the PLT hardware interface 120). The ICT 200 can include a standardized hardware interface 210 (e.g., a first hardware interface), a cassette 220 (e.g., a second hardware interface). The ICT 200 can optionally include a fixture 230 and/or a computer 240. All or a subset of the ICT components can be removable from the ICT (e.g., the ICT housing) and/or permanently affixed to the ICT (e.g., the ICT housing).

The standardized hardware interface 210 is configured to mate with the PLT hardware interface 120, enabling the transfer of information (e.g., commands in the test plan, test scores, etc.) between the ICT 200 and the PLT 100. However, the standardized hardware interface 210 can be otherwise configured.

Figure 8A:
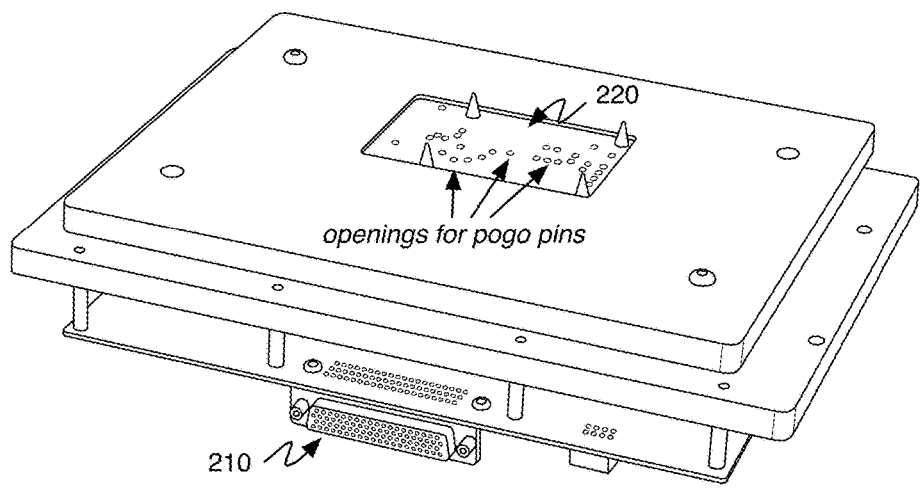
FIGS. 8A and 8B depict examples of an in-circuit tester standardized hardware interface and an in-circuit tester cassette.
Figure 8B:
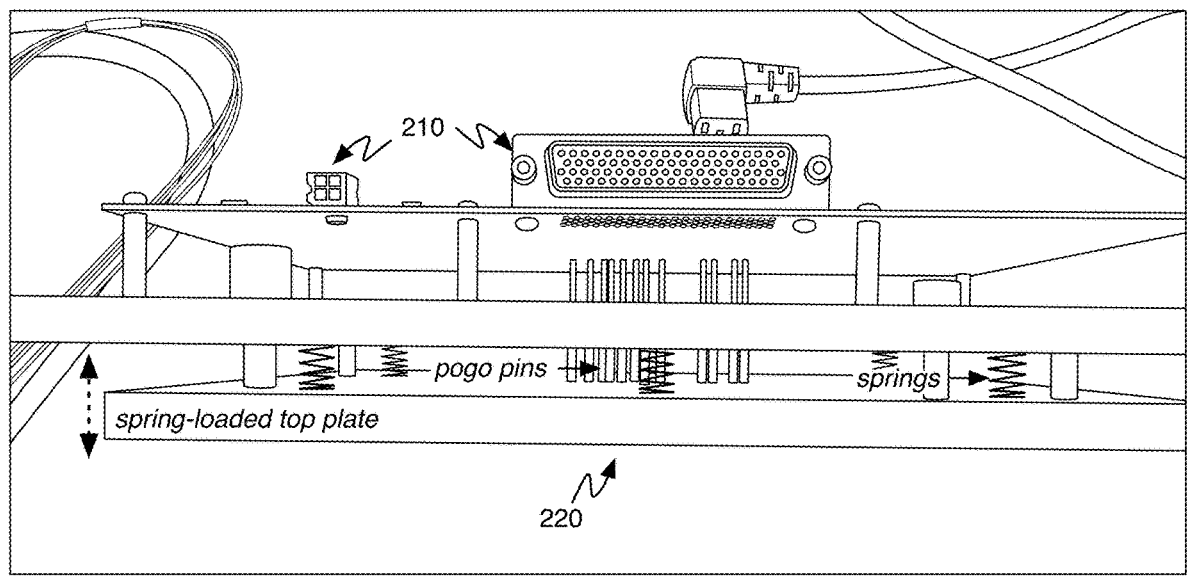
Figure 9A:
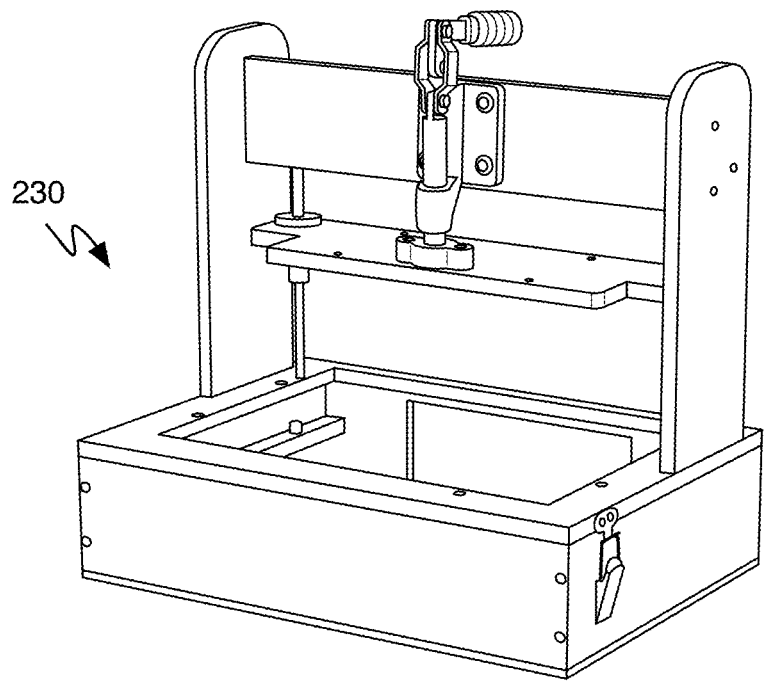
FIG. 9A depicts an example of an in-circuit tester fixture.
Figure 9B:
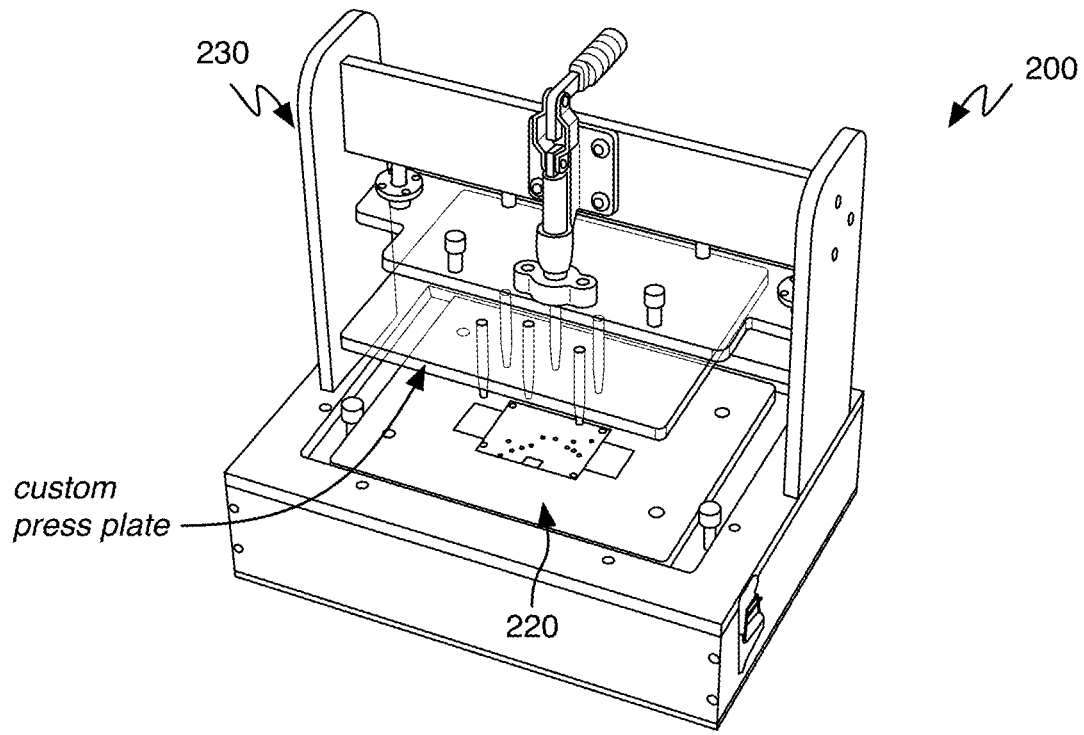
FIG. 9B depicts an example of an in-circuit tester.
Figure 10A:
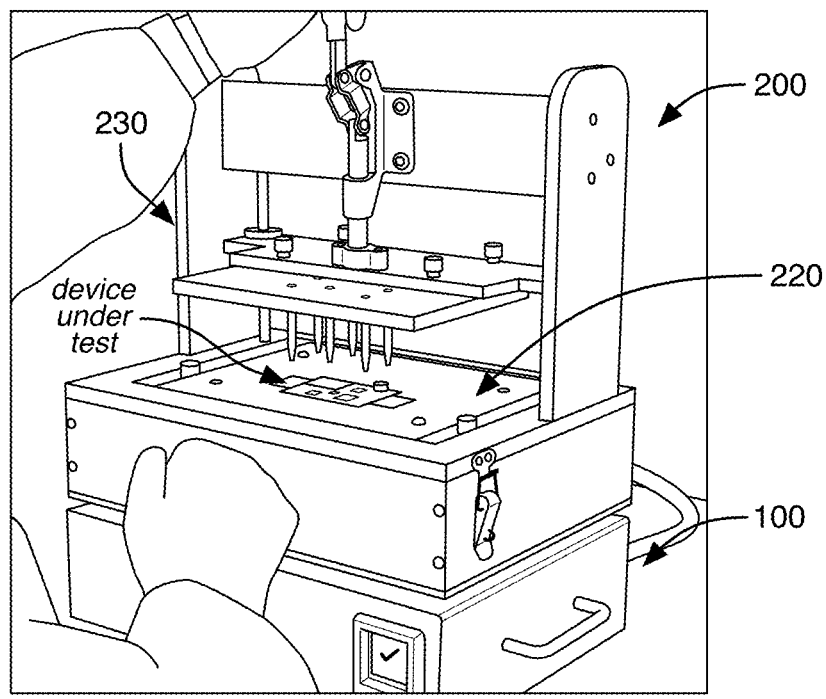
FIGS. 10A and 10B depict illustrative examples of an in-circuit tester with a device under test.
Figure 10B:
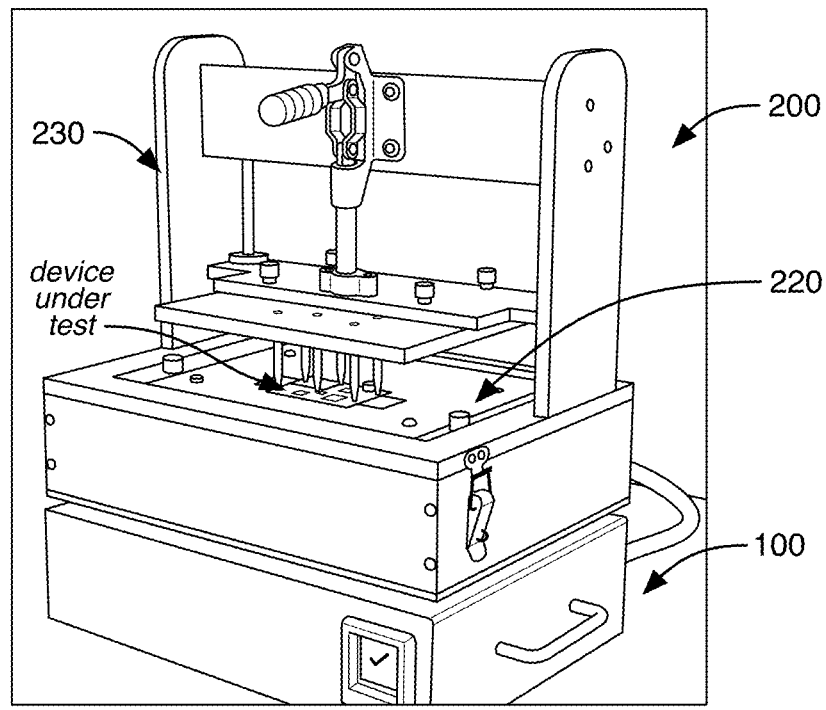

The cassette 220 is configured to mate with the DUT. Preferably, the cassette 220 is custom designed for a DUT, but can alternatively be generic across multiple DUTs. The cassette 220 can be custom for a test plan and/or generic across test plans. Preferably, the cassette 220 implements a physical connection with the DUT, but alternatively does not use a physical connection. In a first variant, the cassette 220 is a bed-of-nails fixture. The size of the bed-of-nails fixture, the position of each nail, and/or the position of the bed-of-nails fixture in relation to the DUT can optionally be determined based on the DUT and/or based on the test plan (e.g., wherein the minimum number of nails are used to line up with test points of the DUT required for the test plan). In a second variant, the cassette 220 is a pogo-pin cassette (PPC), wherein the PPC includes a spring-loaded mechanism that physically connects the pogo-pins to the DUT. Preferably, the pogo-pins are removable, but can alternatively be permanent. The PPC can optionally be modular, wherein pogo-pins that are not needed for a given DUT or test plan are removed. The size of the PPC, the position of any pogo pin, and/or the position of the PPC in relation to the DUT can optionally be determined based on the DUT and/or based on the test plan (e.g., wherein the minimum number of pogo pins are used to line up with test points of the DUT required for the test plan). In a first example, a top plate of the PPC is spring-loaded and includes holes wherein the pogo-pins are exposed when the top plate is compressed. In a second example, the spring-loaded mechanism includes individual spring-loaded pogo-pins. In a third variant, the cassette 220 can include flying probes (e.g., for a flying probe ICT and/or other fixtureless ICT), wherein the probes can be controlled using the PLT computer 150 and/or the ICT computer 240. Examples are shown in FIG. 8A and FIG. 8B However, the cassette 220 can be otherwise configured.

The fixture 230 functions to couple the cassette 220 to a DUT (e.g., to ensure a consistent physical connection between the DUT and the cassette 220, to ensure proper relative positioning between the DUT and the cassette 220, etc.). The fixture 230 can be standardized across varying DUTs, standardized across DUTs of similar sizes, custom to each individual DUT, and/or otherwise configured. The fixture 230 can optionally include a manual and/or automatic mechanism to secure the DUT to the cassette 220. In an illustrative example, the fixture 230 is designed with a custom pressing plate based on the DUT and/or cassette 220 to press the DUT onto the cassette 220 (e.g., wherein pressing the DUT onto the cassette 220 vertically shifts a spring-loaded top plate of the cassette 220 such that the pogo-pins are exposed and in contact with the DUT). Examples of the fixture 230 are shown in FIG. 9A, FIG. 9B, FIG. 10A, and FIG. 10B.

Optionally, the ICT 200 can include a computer 240 (e.g., a single-board computer and/or any other computing system). The ICT computer 240 can function to enable "twinning" with the PLT computer 150 such that a user at the production site can run test plans (e.g., nonstandard, organization-specific test plans) without additional setup. However, the computer 240 can be otherwise configured.

However, the ICT 200 can be otherwise configured.

The remote cloud system 300 can function to facilitate information transfer between the remote user interface 400 and the PLT 100 (e.g., via the communication module 152 of the PLT 1*oo*). Information transfer via the remote cloud system 300 and/or information storage at the remote cloud system 300 can be performed automatically (e.g., responsive to a request), manually, semi-automatically, and/or otherwise performed.

Information transfer between the remote cloud system 300 and the remote user interface 400 can include receiving software (e.g., firmware, test plans, etc.) from the user interface 400 and/or sending test reports to the user interface 400. Information transfer between the remote cloud system 300 and the PLT 100 can include deploying software to the PLT 100 and/or receiving test reports from the PLT 100.

When information or data is transferred or stored, the information or data can be: cleartext, hashes, in an encrypted format (e.g., encrypted with a key associated with the PLT 100, the remote cloud system 300, a user, etc.), signed (e.g., with a verification key associated with the PLT 100, the remote cloud system 300, a user, etc.), and/or otherwise transmitted. The sending systems can be authenticated, authorized, and/or otherwise verified by the receiving systems before establishing a communication channel (e.g., using credentials, tokens, passwords, or other authentication or authorization mechanisms); alternatively, the sending systems can be unauthorized and/or unauthenticated. Authentication can be one-way or mutual.

Authentication can be used for information transfer with PLT communication module 152 (e.g., as previously described) and/or with the remote user interface 400. In a first variant, authentication between the remote cloud system 300 and the remote user interface 400 can include a tiered authentication system based on user groups. For example, the user groups (e.g., within a single organization and/or across multiple organizations) can include administrators, managers, and viewers, wherein administrators have the highest access level and viewers have the lowest access level. In an illustrative example, administrators can view test reports for all PLT deployment groups as well as design and deploy test plans for all PLT deployment groups; managers can view test reports for one or more assigned PLT deployment groups as well as design and deploy test plans for one or more assigned PLT deployment groups; and viewers can view test reports for one or more assigned PLT deployment groups (e.g., without access to design and/or deploy new test plans). Each user can have a unique authentication token and/or can be associated with an authentication token for the user group, wherein the remote cloud system 300 stores a mapping between authentication tokens and PLTs (e.g., PLT deployment groups). In a second variant, authentication between the remote cloud system 300 and the remote user interface 400 is performed at a single tier. In a first example, an organization is associated with one or more authentication tokens that enable any user in the organization access to test reports and/or test plans for each PLT 100 associated with the organization. In a second example, authentication occurs on a per-user basis, wherein each user is independently associated with a unique authentication token and a set of accessible PLTs. However, any suitable authentication system can be used.

Optionally, the remote cloud system 300 can function to store and/or organize information, including: test reports; test plans; command libraries; PLT connection status to the remote cloud system 300; PLT locations; identifiers and/or authentication tokens for PLTs, ICTs, DUTs, and/or users; PLT 100 and/or user associations with organizations, projects, deployment groups, user groups, users, PLTs, ICTs, and/or DUTs; and/or any other information.

However, the remote cloud system 300 can be otherwise configured.

The remote user interface 400 can function to enable a user to design and/or upload test plans remotely to a PLT 100 and/or to remotely view test reports for a PLT 100. The remote user interface 400 can be connected to the remote cloud system 300 and/or any other system component. The remote user interface 400 can be hosted on a computer, a mobile device, and/or any other suitable system. Preferably, the remote user interface 400 is hosted remotely from a PLT 100, but can alternatively be hosted locally to a PLT 100.

Figure 4:
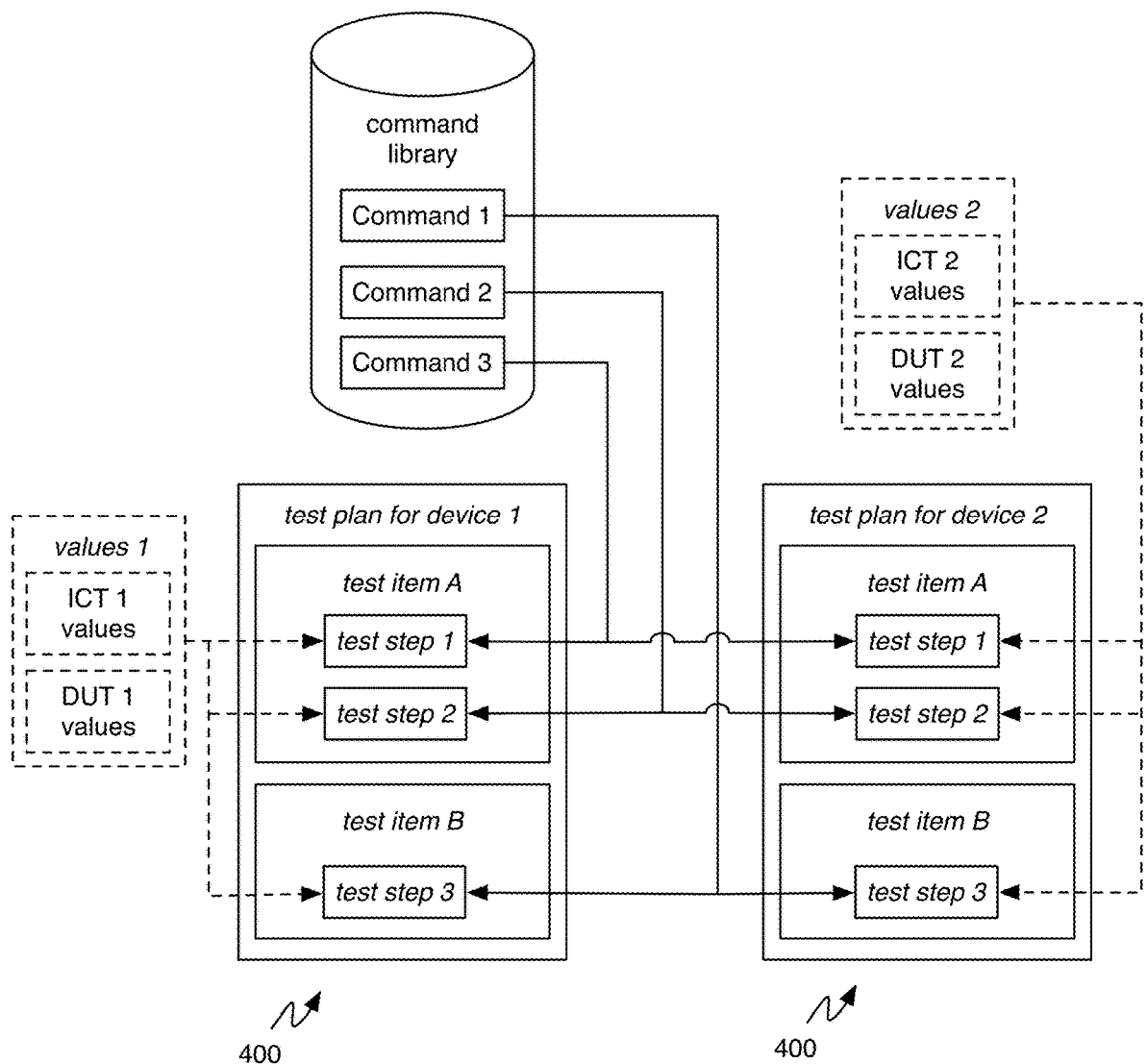
FIG. 4 is a schematic representation of an example of test plans.

Designing (e.g., writing, editing, etc.) test plans at the remote user interface 400 can include accessing pre-designed commands from a library of commands and arranging the commands in an order according to a series of test steps (e.g., wherein groups of test steps form test items in the test plan). The library of commands can optionally be associated with a device class, wherein commands used for a given device are selected from the library associated with the corresponding device class. Illustrative examples of device classes include: Raspberry Pi, Raspberry Pi Compute Module, Variscite, Variscite DART-MX8M-MINI, Beagle-Bone Black, ATECC508a, and/or any other category of devices and/or device components. An example is shown in FIG. 4. Alternatively, test plans and/or any command within a test plan can be designed from scratch.

In a first variant, the commands in the test plan are not edited after selection from the library. In a second variant, the commands can be modified based on a desired test purpose, the DUT, and/or the associated ICT 200. In a specific example, sections of the commands are locked (e.g., fixed) from user editing while other sections are editable. In a third variant, the commands remain unedited while separate arguments in the test plan can be added and/or modified based on the desired test purpose, the DUT, and/or the associated ICT 200. Examples of modifications (e.g., to commands and/or test plan arguments) include: setting location values (e.g., pin mapping locations) based on the ICT 200, setting threshold values (e.g., voltage threshold, impedance threshold, etc.), setting calibration parameters (e.g., previously determined values), setting testing sequences (e.g., current patterns, voltage patterns, pattern parameters, such as wave shape, etc.), and/or any other modifications (e.g., specifying values for one or more test parameters). For example, the test plan can specify a location (e.g., pin identifier) on the standard hardware interface and/or a location (e.g., pin identifier) on the cassette. An example is shown in FIG. 5A. Additionally or alternatively, a pre-written test plan (e.g., a prior test plan iteration) can be accessed and edited. In a fourth variant, a portion of the commands are editable (e.g., test-specific commands), while others are not (e.g., communication commands, authentication commands, etc.).

Figure 11A:
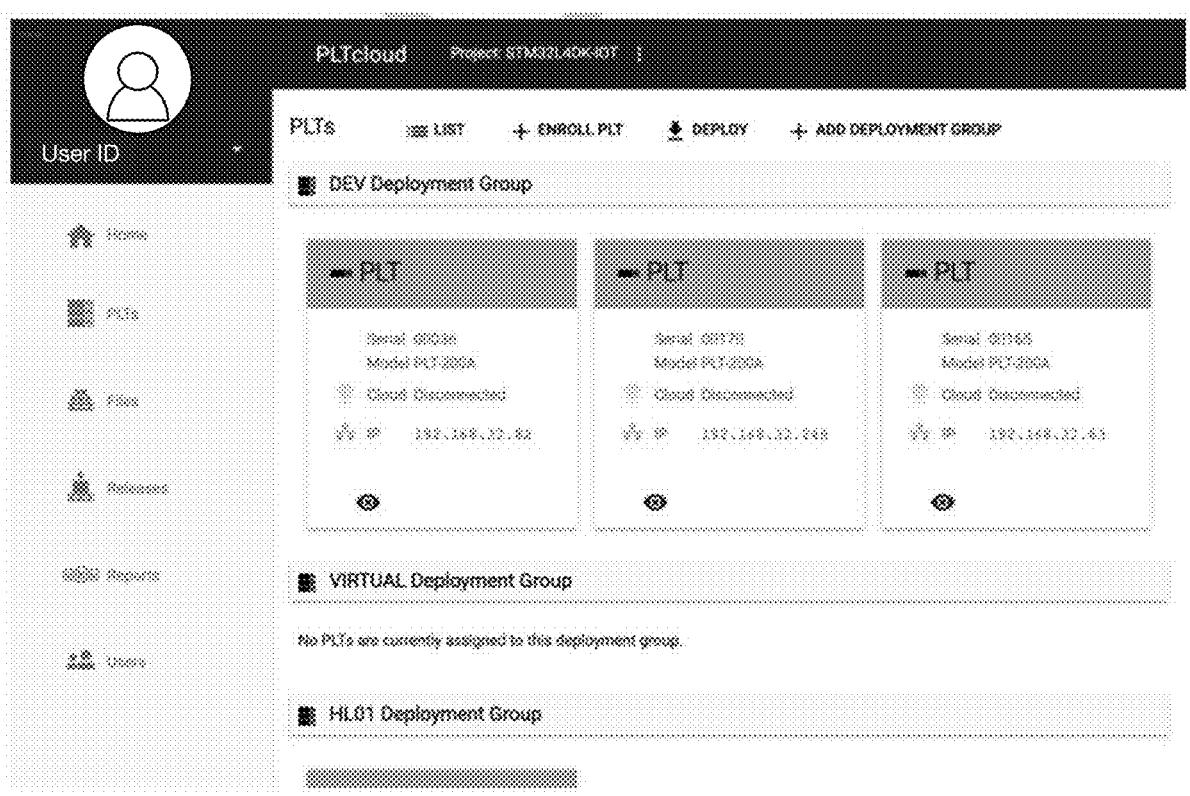
Figure 11B:
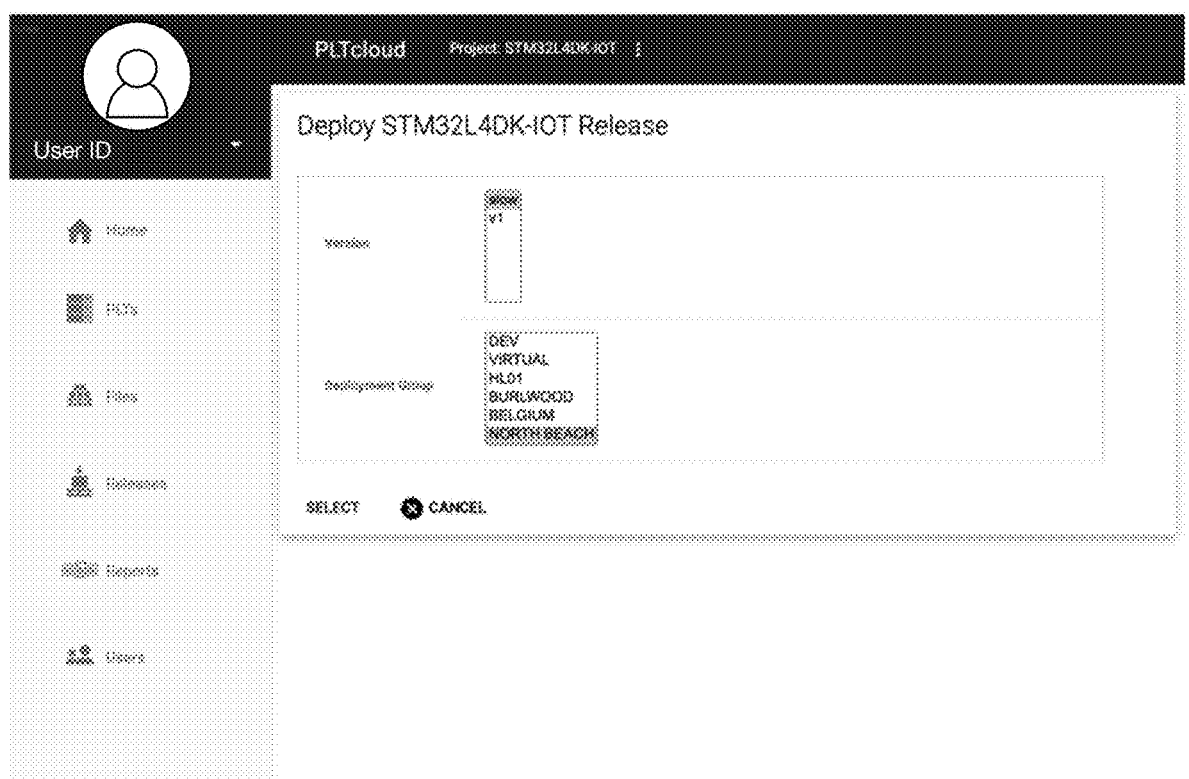

Deploying a test plan to a set of PLTs from the remote user interface 400 can include uploading the test plan to the remote cloud system 300, wherein the remote cloud system 300 uploads the test plan to the set of PLTs. The set of PLTs can be all PLTs in a PLT deployment group (e.g., selected at the remote user interface 400) and/or any other PLT group. Optionally, additional software (e.g., PLT software, DUT software, etc.) can be deployed from the remote user interface 400 via the remote cloud system 300. An example is shown in FIG. 11B.

Figure 11C:
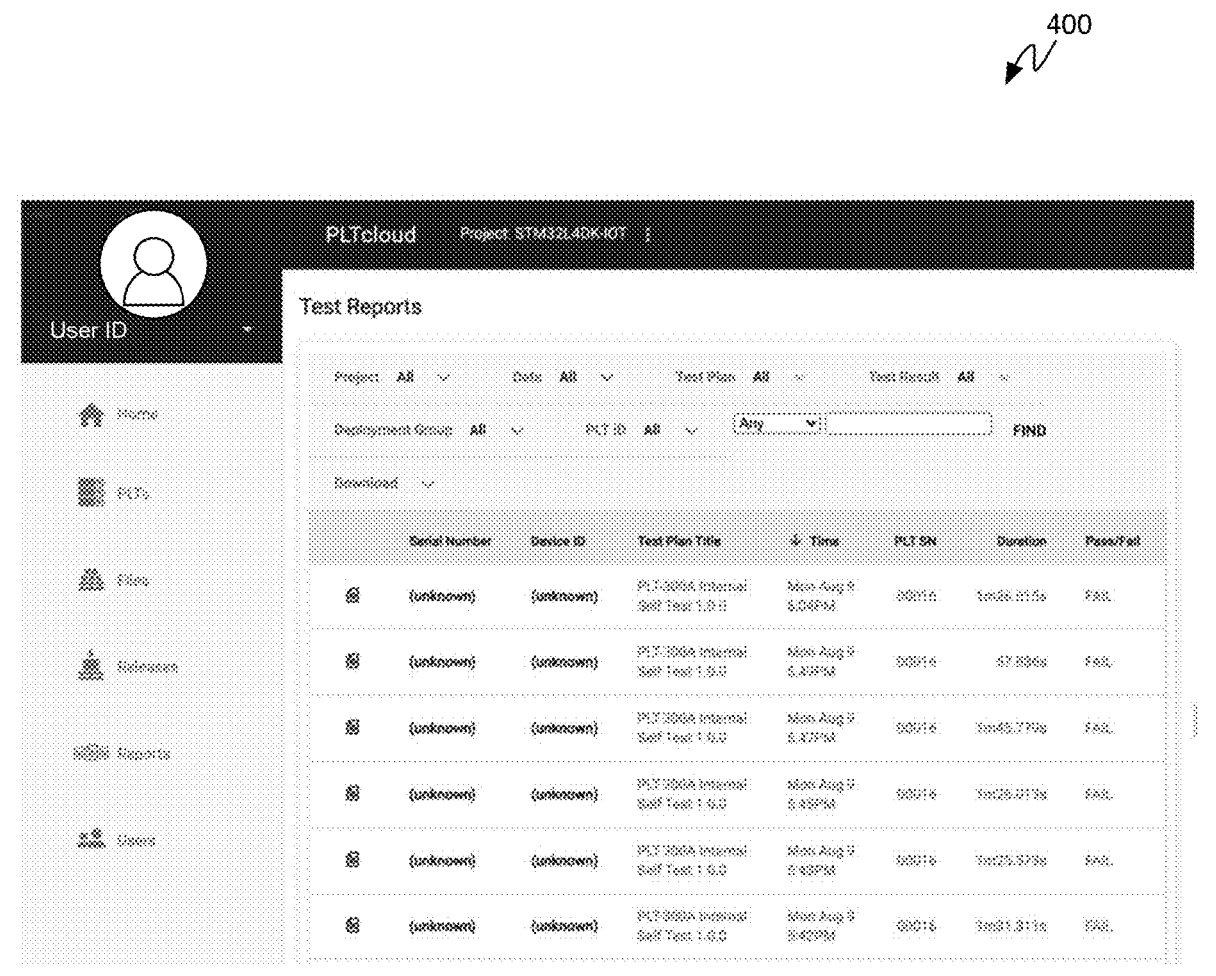

Viewing a test report at the remote user interface 400 can include receiving (e.g., accessing) the test report from the remote cloud system 300 and displaying the test report. Test reports can be organized at the remote user interface 400 based on: PLT identifier, PLT deployment group, date of test plan execution, DUT, project, organization, test plan, test score, and/or any other information. An example is shown in FIG. 11C.

The remote user interface 400 can optionally be used to view additional information, including: PLT status (e.g., whether a PLT 100 is connected to the cloud, time and/or identification of previous tests, current deployed test plan, deployment group, location, etc.), user groups, PLT groups, identifiers (e.g., for users, PLTs, DUTs, ICTs, etc.), test plan iterations, and/or any other system information. An example is shown in FIG. 11A.

The remote user interface 400 can optionally provide notifications to a user. The remote user interface 400 can use visual, auditory, and/or haptic outputs to notify the user. The notifications can be provided in response to: failure of a test step and/or test plan, a test score below or above a threshold, a threshold number of test step and/or test item failures (e.g., within a PLT deployment group), a connection break between a PLT 100 and the remote cloud interface 300, and/or at any other time.

However, the remote user interface 400 can be otherwise configured.

The method can optionally include an application (e.g., native application, browser application, etc.) executable on a user device which can function to provide notifications to a user. The user device can be a mobile device (e.g., mobile computing device) associated with the user, including mobile phones, laptops, smartphones, tablets, watches, and/or any other suitable mobile device. The user device can be connected to the remote cloud system 300 and/or the remote user interface 400. Preferably, the application can be used to send notifications to one or more users (e.g., as described for the remote user interface 400), but can alternatively perform any other functionality of the remote user interface 400. However, the application can be otherwise configured.

Different subsystems and/or modules discussed above can be operated and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

As a person skilled in the art will recognize from the previous detailed description and from the figures and claims, modifications and changes can be made to the preferred embodiments of the invention without departing from the scope of this invention defined in the following claims.

We claim:

1. A system for modular electronic testing, comprising:
    a standardized control system, comprising a power supply, an integrated circuit (IC) programmer, a digital multimeter, and a computer;
    a first in-circuit tester (ICT) comprising a standardized hardware interface configured to mate with the standardized control system and a first hardware interface configured to mate with a first device;
    a second ICT comprising the standardized hardware interface and a second hardware interface configured to mate with a second device;
    a remote cloud system configured to connect to a user interface and to the standardized control system, wherein the remote cloud system is configured to connect to the user interface using a tiered authentication, the tiered authentication comprising:
        the remote cloud system authenticating an administrator user associated with a first security credential, wherein authenticating the administrator user grants the administrator user access at the user interface to view test reports and edit test plans for all standardized control systems in a set of standardized control systems associated with the administrator user; and
        the remote cloud system authenticating a manager user associated with a second security credential, wherein authenticating the manager user grants the manager user access at the user interface to view test reports and edit test plans for only a subset of the set of standardized control systems, wherein the subset is associated with a deployment group; and
    the user interface, configured to:
        send a first test plan to the remote cloud system, wherein the first test plan comprises a set of commands selected from a library of commands, wherein a command in the set of commands is modified using a first value associated with the first ICT;
        send a second test plan to the remote cloud system, wherein the second test plan comprises the set of commands, wherein a command in the set of commands is modified using a second value associated with the second ICT;
        receive a first test report associated with the first device from the remote cloud system; and
        receive a second test report associated with the second device from the remote cloud system.

2. The system of claim 1, wherein the first value comprises a first location on the standardized hardware interface, and wherein the second value comprises a second location on the standardized hardware interface.

3. The system of claim 1, wherein the command in the set of commands is configured to determine whether a voltage measured with the digital multimeter is above a voltage threshold, wherein the first value further comprises a first voltage threshold value associated with the first device, and wherein the second value further comprises a second voltage threshold value associated with the second device.

4. The system of claim 1, wherein the first test report comprises at least one test score for each step of the first test plan and the second test report comprises at least one test score for each step of the second test plan.

5. The system of claim 4, wherein each step of the first and second test plans corresponds to an individual command of the set of commands.

6. The system of claim 4, wherein the user interface is configured to notify a user when a test score indicates failure.

7. The system of claim 6, wherein the system further comprises an application executable on a mobile computing device, wherein the remote cloud system is configured to notify the user at the application when the test score indicates failure.

8. The system of claim 1, wherein the remote cloud system is configured to receive the test reports from a set of standardized control systems comprising the standardized control system, wherein each of the set of standardized control systems is configured to generate test reports.

9. The system of claim 1, wherein the remote cloud system is configured to receive a test report from the standardized control system in real-time, in response to generation of the test report.

10. The system of claim 1, wherein, in response to detection that the standardized control system is not connected to the remote cloud system, the standardized control system locally stores generated test reports.

11. The system of claim 1, wherein the standardized control system is continuously connected to the remote cloud system.

12. The system of claim 1, wherein the first test plan comprises the set of commands in an ordered arrangement, and wherein the second test plan comprises the set of commands in the ordered arrangement.

13. The system of claim 1, wherein the remote cloud system is configured to connect to the standardized control system using a secure two-way authentication.

14. The system of claim 13, wherein the standardized control system locally stores a first cryptographic datum associated with remote cloud system, and the remote cloud system stores a second cryptographic datum associated with the standardized control system, wherein the secure two-way authentication comprises:
the remote cloud system authenticating the standardized control system using the second cryptographic datum; and
the standardized control system authenticating the remote cloud system using the first cryptographic datum.

15. The system of claim 1, wherein the deployment group is associated with the first device.

16. The system of claim 1, wherein the tiered authentication further comprises: the remote cloud system authenticating a viewer user associated with a third authentication token, wherein authenticating the viewer user grants the viewer user access at the user interface to view test reports for the subset of the set of standardized control systems.

17. The system of claim 1, wherein a section of each command in the set of commands is editable by a user and a section of each command in the set of commands is fixed.

18. The system of claim 1, wherein the first and second devices share a device class, wherein the library of commands is associated with the device class.

19. A system for modular electronic testing, comprising:
a standardized control system, comprising a power supply, an integrated circuit (IC) programmer, a digital multimeter, and a computer;
a first in-circuit tester (ICT) comprising a standardized hardware interface configured to mate with the standardized control system and a first hardware interface configured to mate with a first device;
a second ICT comprising the standardized hardware interface and a second hardware interface configured to mate with a second device;
a remote cloud system configured to connect to a user interface and to the standardized control system, wherein the remote cloud system is configured to connect to the user interface using a tiered authentication, the tiered authentication comprising:
the remote cloud system authenticating an administrator user associated with a first authentication token, wherein authenticating the administrator user grants the administrator user access at the user interface to view test reports and edit test plans for all standardized control systems in a set of standardized control systems associated with the administrator user; and
the remote cloud system authenticating a manager user associated with a second authentication token, wherein authenticating the manager user grants the manager user access at the user interface to view test reports and edit test plans for only a subset of the set of standardized control systems, wherein the subset is associated with a deployment group; and
user interface, configured to:
send a first test plan to the remote cloud system, wherein the first test plan comprises a set of commands selected from a library of commands, wherein a command in the set of commands is modified using a first value associated with the first ICT;
send a second test plan to the remote cloud system, wherein the second test plan comprises the set of commands, wherein a command in the set of commands is modified using a second value associated with the second ICT;
receive a first test report associated with the first device from the remote cloud system; and
receive a second test report associated with the second device from the remote cloud system.

20. The system of claim 19, wherein the deployment group is associated with the first device.

21. The system of claim 19, wherein the tiered authentication further comprises: the remote cloud system authenticating a viewer user associated with a third authentication token, wherein authenticating the viewer user grants the viewer user access at the user interface to view test reports for the subset of the set of standardized control systems.

* * * * *

UNITED STATES PATENT AND TRADEMARK OFFICE
CERTIFICATE OF CORRECTION

| | | |
|---|---|---|
| PATENT NO. | : 12,399,217 B1 | Page 1 of 1 |
| APPLICATION NO. | : 17/717810 | |
| DATED | : August 26, 2025 | |
| INVENTOR(S) | : Rauer et al. | |

It is certified that error appears in the above-identified patent and that said Letters Patent is hereby corrected as shown below:

In the Claims

Column 14, Line 30, In Claim 19, before "user", insert --the--

Signed and Sealed this
Twenty-eighth Day of October, 2025

John A. Squires
*Director of the United States Patent and Trademark Office*